(12) United States Patent
Tamura et al.

(10) Patent No.: US 12,438,242 B2
(45) Date of Patent: Oct. 7, 2025

(54) SECONDARY BATTERY

(71) Applicant: SANYO Electric Co., Ltd., Daito (JP)

(72) Inventors: Kazuaki Tamura, Hyogo (JP); Yoshifumi Magari, Hyogo (JP); Atsutoshi Ako, Hyogo (JP); Akira Nishida, Hyogo (JP); Kentaro Tsukamoto, Hyogo (JP); Tomoyuki Yamada, Hyogo (JP)

(73) Assignee: SANYO Electric Co., Ltd., Daito (JP)

( * ) Notice: Subject to any disclaimer, the term of this patent is extended or adjusted under 35 U.S.C. 154(b) by 1052 days.

(21) Appl. No.: 17/415,139

(22) PCT Filed: Dec. 17, 2019

(86) PCT No.: PCT/JP2019/049493
§ 371 (c)(1),
(2) Date: Jun. 17, 2021

(87) PCT Pub. No.: WO2020/137714
PCT Pub. Date: Jul. 2, 2020

(65) Prior Publication Data
US 2022/0059911 A1    Feb. 24, 2022

(30) Foreign Application Priority Data

Dec. 27, 2018    (JP) .................. 2018-244060

(51) Int. Cl.
*H01M 50/54* (2021.01)
*B23K 26/21* (2014.01)
(Continued)

(52) U.S. Cl.
CPC ......... *H01M 50/538* (2021.01); *H01M 4/661* (2013.01); *H01M 4/70* (2013.01);
(Continued)

(58) Field of Classification Search
CPC .. H01M 50/538; H01M 50/533; H01M 4/661; H01M 4/70; H01M 10/0431; H01M 10/0587
(Continued)

(56) References Cited

U.S. PATENT DOCUMENTS 6,238,819 B1 *   5/2001   Cahill ................. H01M 50/536
                                                        429/243
2011/0081574 A1 *  4/2011  Jo ..................... H01M 10/0585
                                                        429/211
(Continued)

FOREIGN PATENT DOCUMENTS

JP     2000-138052 A    5/2000
JP     2001-203001 A    7/2001
(Continued)

OTHER PUBLICATIONS

International Search Report dated Mar. 17, 2020, issued in counterpart International Application No. PCT/JP2019/049493 (3 pages).
(Continued)

*Primary Examiner* — Niki Bakhtiari
*Assistant Examiner* — Omar M Kekia
(74) *Attorney, Agent, or Firm* — WHDA, LLP

(57) ABSTRACT

A secondary battery provided with: a belt-like positive electrode plate having a plurality of positive electrode tabs; and a positive electrode current collector which is connected so that the plurality of positive electrode tabs are stacked, wherein the positive electrode plate has a positive electrode core body and a positive electrode active material layer formed on the positive electrode core bodies. At one edge side of the positive electrode plate where the plurality of positive electrode tabs are provided, one surface of the positive electrode core body has formed thereon a first protrusion that protrudes from said surface of the positive (Continued)

electrode core body in the thickness direction of the positive electrode core body, whereas the other surface of the positive electrode core body has no protrusion formed to protrude from said other surface of the positive electrode core body in the thickness direction of the positive electrode core body.

10 Claims, 7 Drawing Sheets

(51) Int. Cl.
| | | |
|---|---|---|
| *H01M 4/46* | (2006.01) | |
| *H01M 4/66* | (2006.01) | |
| *H01M 4/70* | (2006.01) | |
| *H01M 10/04* | (2006.01) | |
| *H01M 10/0587* | (2010.01) | |
| *H01M 50/533* | (2021.01) | |
| *H01M 50/538* | (2021.01) | |

(52) U.S. Cl.
CPC ... *H01M 10/0431* (2013.01); *H01M 10/0587* (2013.01); *H01M 50/533* (2021.01)

(58) Field of Classification Search
USPC .......................................................... 429/161
See application file for complete search history.

(56) References Cited

U.S. PATENT DOCUMENTS

| | | |
|---|---|---|
| 2016/0036009 A1 | 2/2016 | Cho et al. |
| 2019/0198853 A1 | 6/2019 | Nishio et al. |
| 2019/0267608 A1 | 8/2019 | Choi et al. |

FOREIGN PATENT DOCUMENTS

| | | |
|---|---|---|
| JP | 2001-266899 A | 9/2001 |
| JP | 2010-086807 A | 4/2010 |
| JP | 2013-131337 A | 7/2013 |
| JP | 2014-82055 A | 5/2014 |
| JP | 2016-33912 A | 3/2016 |
| JP | 2016-115409 A | 6/2016 |
| WO | 2018/004177 A1 | 1/2018 |
| WO | 2018/043443 A1 | 3/2018 |

OTHER PUBLICATIONS

The Extended European Search Report dated Dec. 20, 2021, issued in EP Application No. 19903727.6. (8 pages).

\* cited by examiner

SECONDARY BATTERY

TECHNICAL FIELD

The present invention relates to a secondary battery.

BACKGROUND ART

For power sources for driving an electric vehicle (EV), a hybrid electric vehicle (HEV, PHEV), and the like, secondary batteries such as an alkali secondary battery and a non-aqueous electrolyte secondary battery have been used.

In each of the secondary batteries, a bottomed cylindrical exterior member having an opening and a sealing plate that seals the opening constitute a battery case. An electrode assembly composed of a positive electrode plate, a negative electrode plate, and a separator, together with an electrolyte, is housed in the battery case. A positive electrode terminal and a negative electrode terminal are attached to the sealing plate. The positive electrode terminal is electrically connected to the positive electrode plate via a positive electrode current collector, and the negative electrode terminal is electrically connected to the negative electrode plate via a negative electrode current collector.

As the secondary battery, a secondary battery comprising a flat-shaped wound electrode assembly obtained by winding a strip-shaped positive electrode plate having a plurality of positive electrode tabs and a strip-shaped negative electrode plate having a plurality of negative electrode tabs with a strip-shaped separator therebetween has been proposed (Patent Literature 1, described below).

A technique for cutting a positive electrode plate or a negative electrode plate using a continuous oscillation laser to form a curved portion having a larger thickness than a thickness of a core body (current collector foil) constituting the positive electrode plate or the negative electrode plate in a cut end portion of the core body has been proposed (Patent Literature 2, described below).

CITATION LIST

Patent Literature

PATENT LITERATURE 1: Japanese Unexamined Patent Application Publication No. 2016-115409
PATENT LITERATURE 2: Japanese Unexamined Patent Application Publication No. 2016-33912

SUMMARY

It is an advantage of the present invention to provide a highly reliable secondary battery.

A secondary battery according to an aspect of the present invention comprises a strip-shaped first electrode plate having a plurality of first electrode tabs, a strip-shaped second electrode plate having a different polarity from that of the first electrode plate, a flat-shaped wound electrode assembly obtained by winding the first electrode plate and the second electrode plate with a strip-shaped separator therebetween, and a first electrode current collector connected with the plurality of first electrode tabs laminated, in which the first electrode plate has a first electrode core body made of metal and a first electrode active material layer formed on the first electrode core body, and on a first end side of the first electrode plate on which the plurality of first electrode tabs are provided, a first protrusion protruding in a thickness direction of the first electrode core body from one surface of the first electrode core body is formed on the one surface of the first electrode core body, a protrusion protruding in the thickness direction of the first electrode core body from the other surface of the first electrode core body is not formed on the other surface of the first electrode core body, or a second protrusion protruding in the thickness direction of the first electrode core body from the other surface of the first electrode core body and having a smaller protrusion height than a protrusion height of the first protrusion is formed on the other surface of the first electrode core body, and in the wound electrode assembly, the one surface of the first electrode core body is arranged to be oriented toward a winding center side of the wound electrode assembly.

In the wound electrode assembly, when a protrusion exists on a surface oriented toward a winding outer side (outer peripheral side) of the first electrode core body on the first end side of the first electrode plate, large stress is easily applied to the protrusion. Therefore, the protrusion existing on the surface oriented toward the winding outer side (outer peripheral side) of the first electrode core body on the first end side is easily detached from the first electrode core body. The first electrode plate and the second electrode plate may be short-circuited due to the protrusion detached from the first electrode core body.

According to the above-described configuration, the first protrusion is arranged on a surface oriented toward a winding center side (winding inner side) of the first electrode core body on the first end side of the first electrode plate. Accordingly, stress is not easily applied to the first protrusion, and the first protrusion is not easily detached from the first electrode core body. Therefore, a highly reliable secondary battery in which the first electrode plate and the second electrode plate are effectively prevented from being short-circuited is obtained.

According to the present invention, there can be provided a highly reliable secondary battery.

BRIEF DESCRIPTION OF DRAWINGS

FIG. 3($b$) is a plan view of a positive electrode original plate after tab formation.

FIG. 3($c$) is a plan view of a final positive electrode original plate.

FIG. 3($d$) is a plan view of a positive electrode plate.

FIG. 5($b$) is a plan view of a negative electrode original plate after tab formation.

FIG. 5($c$) is a plan view of a final negative electrode original plate.

FIG. 5($d$) is a plan view of a negative electrode plate.

DESCRIPTION OF EMBODIMENTS

A configuration of a rectangular secondary battery 20 as a secondary battery according to an embodiment will be described below. The present invention is not limited to the following embodiment.

Figure 1:
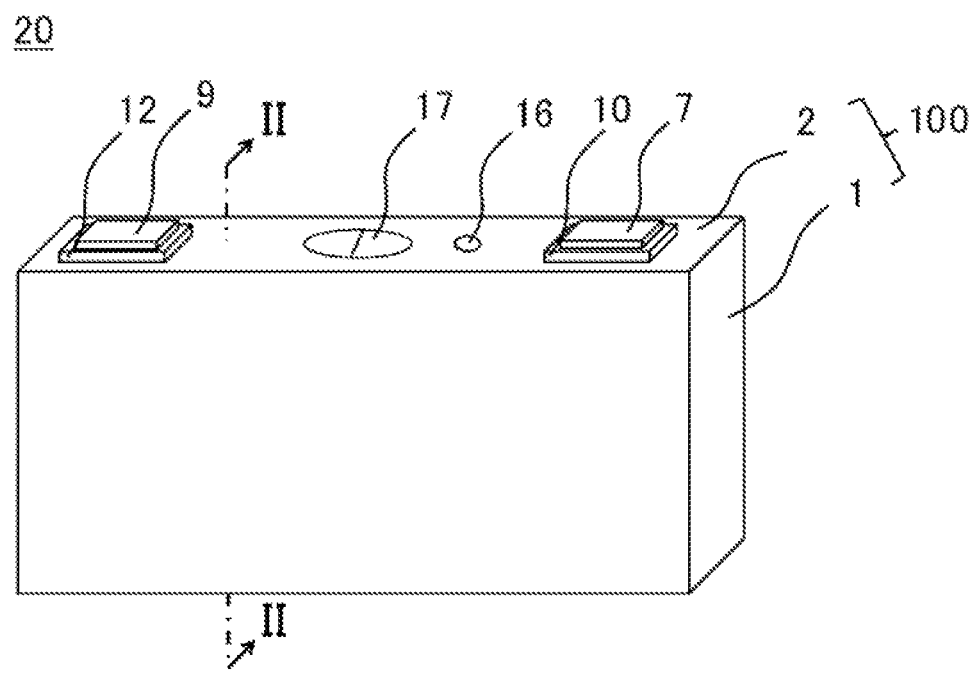
FIG. 1 is a perspective view of a secondary battery according to an embodiment.
Figure 2:
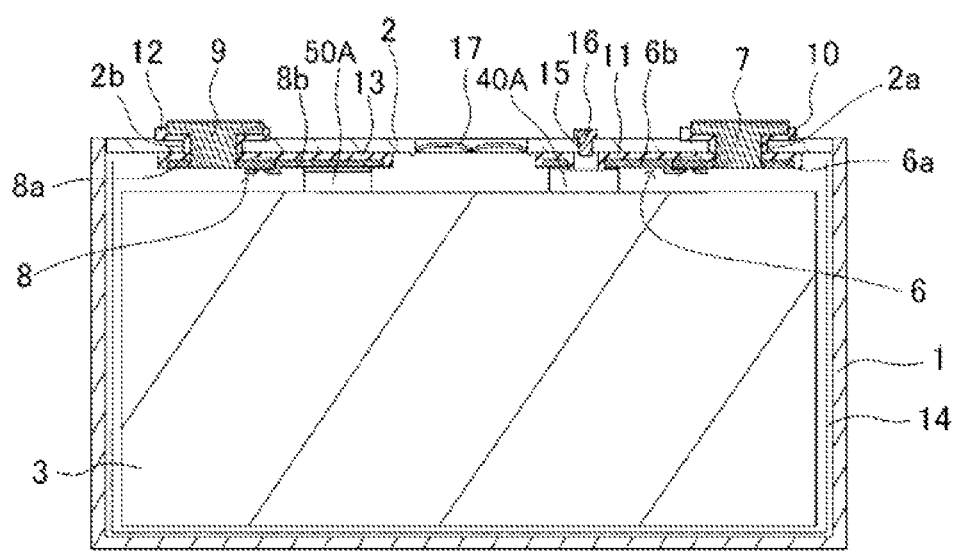
FIG. 2 is a sectional view taken along a line II-II illustrated in FIG. 1.
Figure 3A:
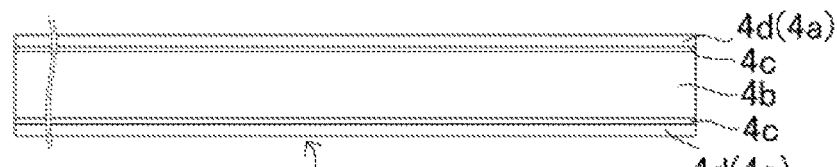
FIG. 3($a$) is a plan view of a positive electrode original plate.
Figure 3B:
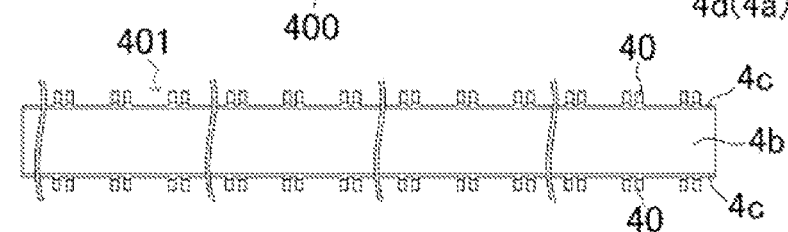
Figure 3C:
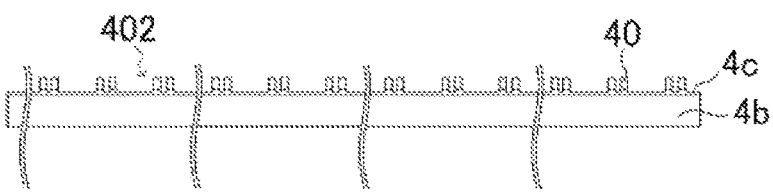
Figure 3D:
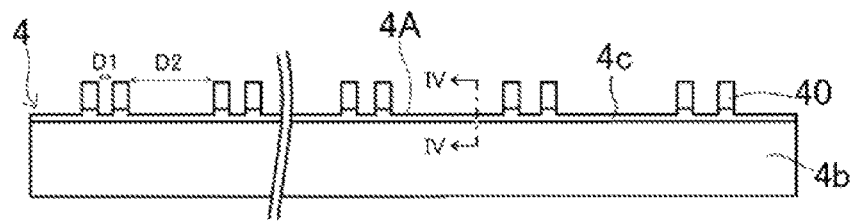

As illustrated in FIG. 1 and FIG. 2, the rectangular secondary battery 20 comprises a battery case 100 composed of a bottomed rectangular cylindrical-shaped rectangular exterior member 1 having an opening and a sealing plate 2 that seals the opening of the rectangular exterior member 1. The rectangular exterior member 1 and the sealing plate 2 are each preferably made of metal. A wound electrode assembly 3 including a positive electrode plate and a negative electrode plate, together with an electrolyte, is housed in the rectangular exterior member 1.

A positive electrode tab group 40A composed of a plurality of positive electrode tabs 40 and a negative electrode tab group 50A composed of a plurality of negative electrode tabs 50 are provided in an end portion on the sealing plate 2 side of the wound electrode assembly 3. The positive electrode tab group 40A is electrically connected to a positive electrode terminal 7 via a second positive electrode current collector 6b and a first positive electrode current collector 6a. The negative electrode tab group 50A is electrically connected to a negative electrode terminal 9 via a second negative electrode current collector 8b and a first negative electrode current collector 8a. The first positive electrode current collector 6a and the second positive electrode current collector 6b constitute a positive electrode current collector 6. The positive electrode current collector 6 may be one component. The first negative electrode current collector 8a and the second negative electrode current collector 8b constitute a negative electrode current collector 8. The negative electrode current collector 8 may be one component.

The first positive electrode current collector 6a, the second positive electrode current collector 6b, and the positive electrode terminal 7 are each preferably made of metal and more preferably made of aluminum or an aluminum alloy. An outer-side insulating member 10 made of resin is arranged between the positive electrode terminal 7 and the sealing plate 2. An inner-side insulating member 11 made of resin is arranged between the first positive electrode current collector 6a and the second positive electrode current collector 6b and the sealing plate 2.

The first negative electrode current collector 8a, the second negative electrode current collector 8b, and the negative electrode terminal 9 are each preferably made of metal and more preferably made of copper or a copper alloy. The negative electrode terminal 9 preferably has a portion made of aluminum or an aluminum alloy and a portion made of copper or a copper alloy. In this case, the portion made of copper or a copper alloy is preferably connected to the first negative electrode current collector 8a, and the portion made of aluminum or an aluminum alloy preferably protrudes more outwardly than the sealing plate 2. An outer-side insulating member 12 made of resin is arranged between the negative electrode terminal 9 and the sealing plate 2. An inner-side insulating member 13 made of resin is arranged between the first negative electrode current collector 8a and the second negative electrode current collector 8b and the sealing plate 2.

An electrode assembly holder 14 composed of a resin sheet made of resin is arranged between the wound electrode assembly 3 and the rectangular exterior member 1. The electrode assembly holder 14 is preferably shaped by bending an insulating sheet made of resin in a bag shape or a box shape. The sealing plate 2 is provided with an electrolyte injection hole 15, and the electrolyte injection hole 15 is sealed with a sealing member 16. The sealing plate 2 is provided with a gas discharge valve 17 that is broken when pressure in the battery case 100 reaches a predetermined value or more and discharges gas in the battery case 100 out of the battery case 100.

Then, details of a method of manufacturing the rectangular secondary battery 20 and each of components in the rectangular secondary battery 20 will be described.

[Positive Electrode Plate]

First, a method of manufacturing a positive electrode plate will be described.

[Production of Positive Electrode Active Material Layer Slurry]

A lithium-nickel-cobalt-manganese composite oxide as a positive electrode active material, polyvinylidene fluoride (PVdF) as a binder, a carbon material as a conductive agent, and N-methyl-2-pyrrolidone (NMP) as a dispersion medium are kneaded such that a mass ratio of the lithium-nickel-cobalt-manganese composite oxide, the PVdF, and the carbon material is 97.5:1:1.5, to produce a positive electrode active material layer slurry.

[Production of Positive Electrode Protective Layer Slurry]

Alumina powder, a carbon material as a conductive agent, polyvinylidene fluoride (PVdF) as a binder, and N-methyl-2-pyrrolidone (NMP) as a dispersion medium are kneaded such that a mass ratio of the alumina powder, the carbon material, and the PVdF is 83:3:14, to produce a protective layer slurry.

[Formation of Positive Electrode Active Material Layer and Positive Electrode Protective Layer]

The positive electrode active material layer slurry and the positive electrode protective layer slurry produced in the above-described method are each applied to both surfaces of an aluminum foil having a thickness of 15 μm as a positive electrode core body with a die coater. At this time, the positive electrode active material layer slurry is applied to a center in a width direction of the positive electrode core body. The positive electrode protective layer slurry is applied to both ends in a width direction of a region to which the positive electrode active material layer slurry is applied.

The positive electrode core body to which the positive electrode active material layer slurry and the positive electrode protective layer slurry are applied is dried, to remove the NMP included in each of the positive electrode active material layer slurry and the positive electrode protective layer slurry. As a result, a positive electrode active material layer and a protective layer are formed. Then, the positive electrode active material layer is compressed by being passed between paired press rollers, to obtain a positive electrode original plate 400.

FIG. 3(*a*) is a plan view of the positive electrode original plate 400 produced in the above-described method. On both surfaces of a strip-shaped positive electrode core body 4*a*, positive electrode active material layers 4*b* are respectively formed in a longitudinal direction of the positive electrode core body 4*a*. Positive electrode protective layers 4*c* are respectively formed in both end portions in a width direction of a region where the positive electrode active material layers 4*b* are formed in the positive electrode core body 4*a*. Positive electrode core body exposure parts 4*d* are respectively formed in a longitudinal direction of the positive electrode original plate 400 in both end portions in a width direction of the positive electrode original plate 400. The thickness of the positive electrode active material layer 4*b* is preferably larger than the thickness of the positive electrode protective layer 4*c*.

FIG. 3(*b*) is a plan view of a positive electrode original plate 401 after tab formation. The positive electrode core body exposure part 4*d* in the positive electrode original plate 400 is cut into a predetermined shape, to produce the positive electrode original plate 401 after tab formation. The positive electrode original plate 400 can be cut by irradiation of an energy beam such as a laser, a metal mold, a cutter (cutting blade), or the like. In the positive electrode original plate 401 after tab formation, the plurality of positive electrode tabs 40 are formed in a longitudinal direction of the positive electrode original plate 401 after tab formation at both ends in a width direction of the positive electrode original plate 401 after tab formation. Each of the positive electrode tabs 40 is composed of the positive electrode core body exposure part 4*d*. As illustrated in FIG. 3(*b*), the positive electrode original plate 400 can be cut such that the positive electrode protective layer 4*c* remains in an end portion of the positive electrode original plate 401 after tab formation formed at a root of each of the positive electrode tabs 40 and between the adjacent positive electrode tabs 40. The positive electrode protective layer 4*c* is not an essential component, and can also be omitted. A portion where the positive electrode active material layer 4*b* is formed may be cut so that the positive electrode protective layer 4*c* does not remain in an end side of the positive electrode original plate 401 after tab formation formed between the adjacent positive electrode tabs 40. The positive electrode original plate 400 is preferably cut by irradiation of an energy beam to form the positive electrode tabs 40.

When the positive electrode original plate 400 is cut using a laser, an output of the laser is preferably 100 W to 1500 W, more preferably 550 W to 1000 W, and still more preferably 600 W to 1000 W. A scanning speed of the laser is preferably 100 mm/s to 5000 mm/s. However, the present invention is not limited to this. A continuous oscillation (CW) laser may be used, or a pulse laser may be used.

FIG. 3(*c*) is a plan view of a final positive electrode original plate 402. In the longitudinal direction of the positive electrode original plate 401 after tab formation, the positive electrode original plate 401 after tab formation is cut in a central portion in the width direction. As a result, the final positive electrode original plate 402 the size in the width direction of which is the size of a positive electrode plate 4 is obtained. That is, the final positive electrode original plate 402 remains not cut to the length of the positive electrode plate 4 in a length direction. In the longitudinal direction of the positive electrode original plate 401 after tab formation, the positive electrode original plate 401 after tab formation is preferably cut using a metal mold, a cutter (cutting blade), or the like when cut in the central portion in the width direction.

FIG. 3(*d*) is a plan view of the positive electrode plate 4. The final positive electrode original plate 402 is cut to a predetermined length, to obtain the positive electrode plate 4. To further improve productivity, the final positive electrode original plate 402 is preferably cut in a process for producing a wound electrode assembly, described below. That is, a portion to be a winding-end end portion is preferably cut while or after the wound electrode assembly is wound. The final positive electrode original plate 402 is preferably cut using a metal mold, a cutter (cutting blade), or the like when cut to the predetermined length.

To obtain a higher output secondary battery, in the wound electrode assembly 3, the positive electrode tabs 40 are preferably provided for each layer of the positive electrode plate 4. That is, the number of positive electrode plate 4 to be laminated and the number of positive electrode tabs 40 to be laminated are preferably the same or substantially the same. Therefore, as illustrated in FIG. 3(*d*), there exist a portion where the positive electrode tabs 40 are arranged at a short distance (D1) and a portion where the positive electrode tabs 40 are arranged at a long distance (D2) in the positive electrode plate 4. In the wound electrode assembly 3, its diameter increases toward a winding outer side (outer peripheral side) from a winding center. Therefore, when the positive electrode tabs 40 are laminated, the distance D1 and the distance D2 are preferably set to gradually increase from a winding-start end portion to a winding-end end portion of the positive electrode plate 4 such that respective positions of the positive electrode tabs 40 are aligned with one another. The same applies to the negative electrode tabs 50, described below.

Figure 4:
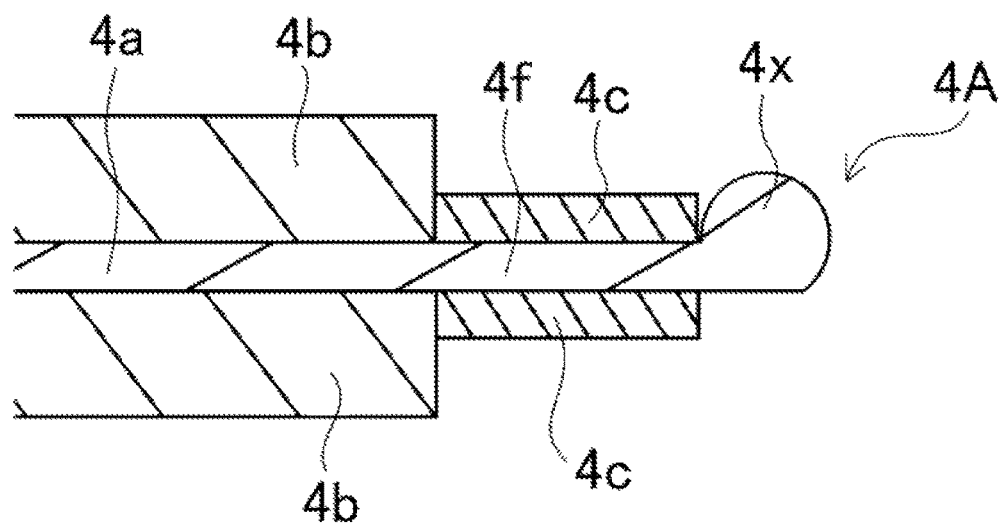
FIG. 4 is a sectional view illustrating a cross section taken along a line IV-IV illustrated in FIG. 3($d$).

FIG. 4 is a sectional view taken along a line IV-IV illustrated in FIG. 3(*d*) and is a sectional view in the vicinity of a first end side 4A, on which the positive electrode tabs 40 are provided, in the positive electrode plate 4. As illustrated in FIG. 4, the vicinity of the first end side 4A of the positive electrode plate 4 has an active material layer non-formation region 4*f*, where the positive electrode active material layer 4*b* is not formed, in the positive electrode core body 4*a*. The positive electrode protective layers 4*c* are respectively formed in portions, adjacent to the positive electrode active material layers 4*b*, in the active material layer non-formation region 4*f*. A first protrusion 4*x* protruding in a thickness direction (in an upward direction in FIG. 4) of the positive electrode core body 4*a* from one surface (an upper surface in FIG. 4) of the positive electrode core body 4*a* is formed in an end portion of the active material layer non-formation region 4*f*. The first protrusion 4*x* has a region not covered with the positive electrode protective layer 4*c*. The first protrusion 4*x* is a portion where the positive electrode core body 4*a* is melted and solidified at the time of laser cutting. The first protrusion 4*x* easily occurs on a surface, on the side irradiated with a laser, of the positive electrode core body 4*a* at the time of later cutting.

On the other surface, positioned on the opposite side to the one surface where the first protrusion 4*x* is formed, of the positive electrode core body 4*a* in the first end side 4A, a protrusion protruding in a thickness direction (a downward direction in FIG. 4) of the positive electrode core body 4a from the other surface is not formed.

On the other surface positioned on the opposite side to the one surface, where the first protrusion 4x is formed, of the positive electrode core body 4a in the first end side 4A, a second protrusion may be formed. However, a protrusion height of the second protrusion (a protrusion height of the second protrusion from the other surface of the positive electrode core body 4a in the thickness direction of the positive electrode core body 4a) is made smaller than a protrusion height of the first protrusion 4x (a protrusion height of the first protrusion 4x from the one surface of the positive electrode core body 4a in the thickness direction of the positive electrode core body 4a).

The shape and the size of the first protrusion 4x and the shape and the size of the above-described second protrusion can be adjusted by adjusting an output of a laser in laser cutting of the positive electrode original plate 400, a scanning speed of the laser, the thickness of the positive electrode core body 4a, and the like. The larger the output of the laser becomes, the larger the protrusion height of the first protrusion 4x tends to be. The larger the scanning speed of the laser becomes, the smaller the protrusion height of the first protrusion 4x tends to be.

[Negative Electrode Plate]

Then, a method of manufacturing a negative electrode plate will be described.

[Production of Negative Electrode Active Material Layer Slurry]

Graphite as a negative electrode active material, styrene-butadiene rubber (SBR) and carboxymethyl cellulose (CMC) as a binder, and water as a dispersion medium are kneaded such that a mass ratio of the graphite, the SBR, and the CMC is 98:1:1, to produce a negative electrode active material layer slurry.

[Formation of Negative Electrode Active Material Layer]

The negative electrode active material layer slurry produced in the above-described method is applied to both surfaces of a copper foil having a thickness of 8 μm as a negative electrode core body with a die coater.

The negative electrode core body to which the negative electrode active material layer slurry is applied is dried, to remove the water included in the negative electrode active material layer slurry. As a result, a negative electrode active material layer is formed. Then, the negative electrode active material layer is compressed by being passed between paired press rollers, to obtain a negative electrode original plate 500.

Figure 5A:
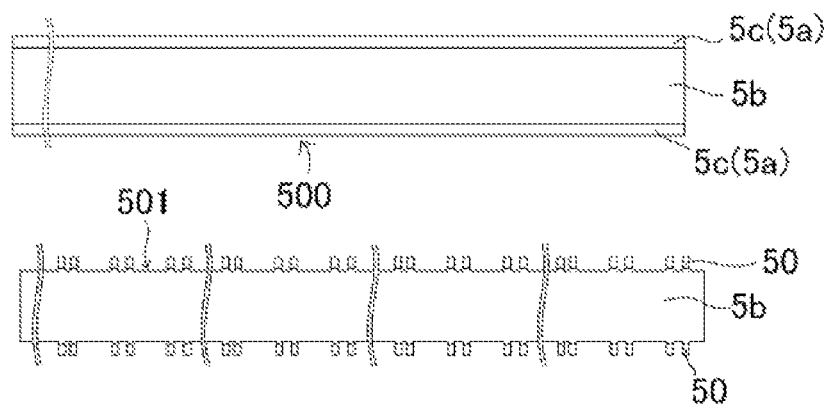
FIG. 5($a$) is a plan view of a negative electrode original plate.

FIG. 5(a) is a plan view of the negative electrode original plate 500 produced in the above-described method. On both surfaces of a strip-shaped negative electrode core body 5a, negative electrode active material layers 5b are respectively formed in a longitudinal direction of the negative electrode core body 5a. Negative electrode core body exposure parts 5c are respectively formed in a longitudinal direction of the negative electrode original plate 500 in both end portions in a width direction of the negative electrode original plate 500.

Figure 5B:
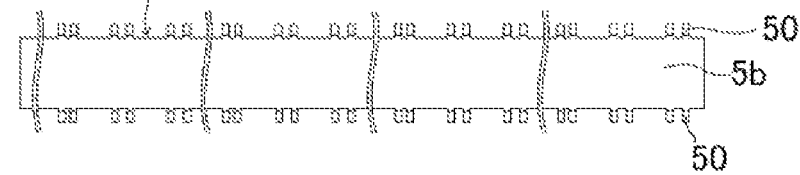

FIG. 5(b) is a plan view of a negative electrode original plate 501 after tab formation. The negative electrode core body exposure part 5c in the negative electrode original plate 501 after tab formation is cut to a predetermined shape, to produce the negative electrode original plate 501 after tab formation. The negative electrode original plate 500 can be cut by irradiation of an energy beam such as a laser, a metal mold, a cutter (cutting blade), or the like. In the negative electrode original plate 501 after tab formation, the plurality of negative electrode tabs 50 are formed in a longitudinal direction of the negative electrode original plate 501 after tab formation at both ends in a width direction of the negative electrode original plate 501 after tab formation. Each of the negative electrode tabs 50 is composed of the negative electrode core body exposure part 5c. The negative electrode original plate 500 is preferably cut by irradiation of an energy beam to form the negative electrode tabs 50.

Figure 5C:
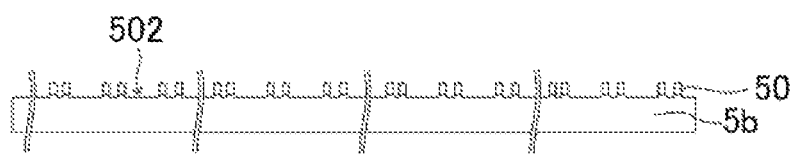

FIG. 5(c) is a plan view of a final negative electrode original plate 502. In the longitudinal direction of the negative electrode original plate 501 after tab formation, the negative electrode original plate 501 after tab formation is cut in a central portion in the width direction. As a result, the final negative electrode original plate 502 the size in the width direction of which is the size of a negative electrode plate 5 is obtained. That is, the final negative electrode original plate 502 remains not cut to the length of the negative electrode plate 5 in a length direction. In the longitudinal direction of the negative electrode original plate 501 after tab formation, the negative electrode original plate 501 after tab formation is preferably cut using a metal mold, a cutter (cutting blade), or the like when cut in the central portion in the width direction.

Figure 5D:
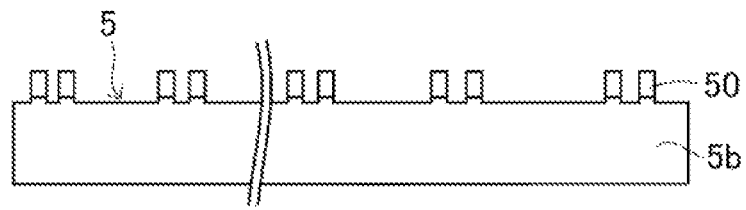

FIG. 5(d) is a plan view of the negative electrode plate 5. The final negative electrode original plate 502 is cut to a predetermined length, to obtain the negative electrode plate 5. To further improve productivity, the final negative electrode original plate 502 is preferably cut in a process for producing a wound electrode assembly, described below. That is, a portion to be a winding-end end portion is preferably cut while or after the wound electrode assembly is wound. The final negative electrode original plate 502 is preferably cut using a metal mold, a cutter (cutting blade), or the like when cut to the predetermined length.

[Production of Wound Electrode Assembly]

The positive electrode plate 4 and the negative electrode plate 5 produced in the above-described methods are each wound with a strip-shaped separator 70 made of polyolefin therebetween, to manufacture the flat-shaped wound electrode assembly 3. As described above, one end of the final positive electrode original plate 402 and one end of the final negative electrode original plate 502 are fed to a winding device, and the final positive electrode original plate 402 and the final negative electrode original plate 502 are preferably respectively cut at predetermined positions while or after the winding.

Figure 6:
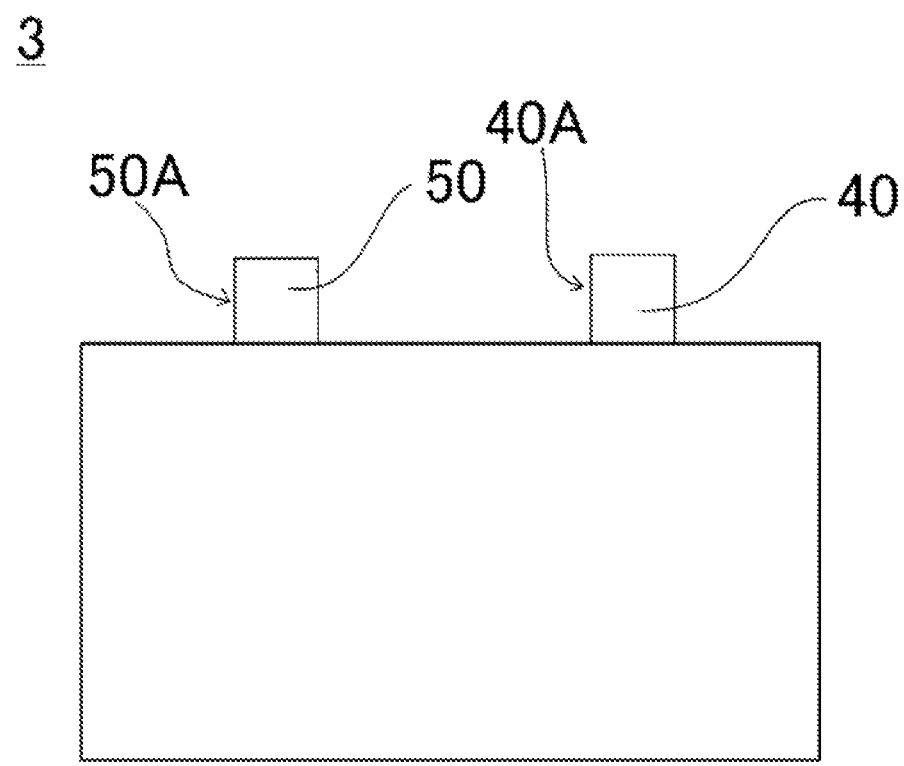
FIG. 6 is a plan view of a wound electrode assembly according to the embodiment.

FIG. 6 is a plan view of the wound electrode assembly 3. In the wound electrode assembly 3, the positive electrode tab group 40A composed of the plurality of positive electrode tabs 40 and the negative electrode tab group 50A composed of the plurality of negative electrode tabs 50 are provided in one end portion in a direction in which a winding axis extends.

Figure 7:
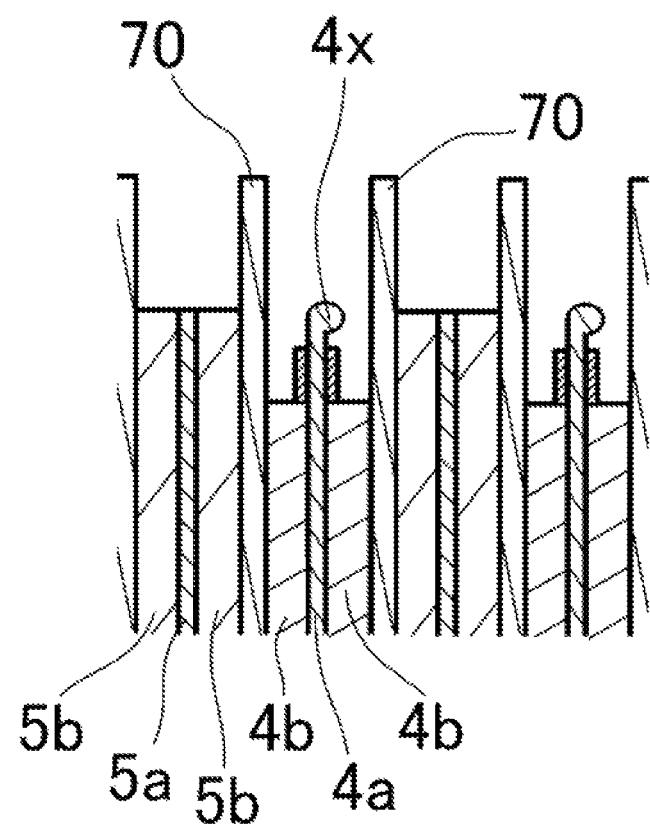
FIG. 7 is a sectional view in the vicinity of a first end side of the positive electrode plate in the wound electrode assembly according to the embodiment.

FIG. 7 is a sectional view in the vicinity of the first end side 4A of the positive electrode plate 4 in the wound electrode assembly 3 and is a sectional view in a direction along the winding axis of the wound electrode assembly 3. The right side in FIG. 7 is a winding center (winding inner side) of the wound electrode assembly 3, and the left side in FIG. 7 is a winding outer side (outer peripheral side) of the wound electrode assembly 3. As illustrated in FIG. 7, in the wound electrode assembly 3, a surface, on which the first protrusion 4x is formed, of the positive electrode core body 4a is arranged to be oriented toward the winding center (winding inner side) of the wound electrode assembly 3. Accordingly, stress is more difficult to apply to the first protrusion 4x than when the surface, on which the first protrusion 4x is formed, of the positive electrode core body 4a is arranged to be oriented toward the winding outer side (outer peripheral side) of the wound electrode assembly 3. Therefore, the first protrusion 4x can be effectively prevented from being detached from the positive electrode core body 4a.

Figure 8:
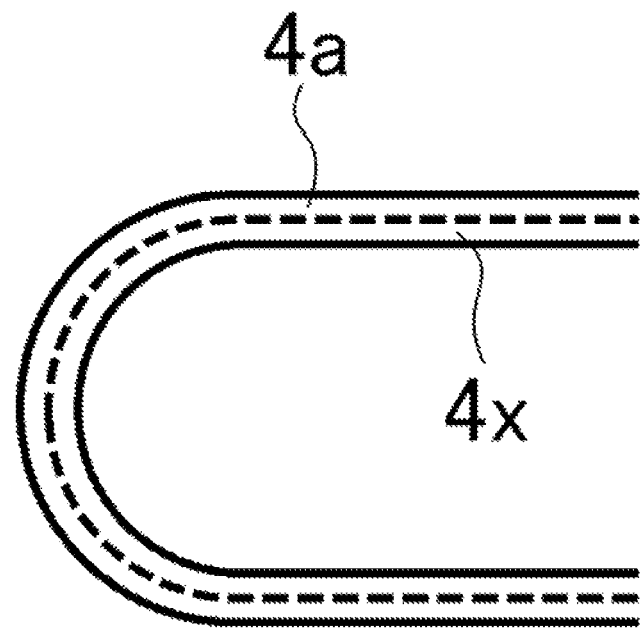
FIG. 8 is a schematic diagram illustrating the vicinity of the first end side in a part of the positive electrode plate according to the embodiment as viewed along a winding axis of the wound electrode assembly.

FIG. 8 is a schematic diagram illustrating a part of the positive electrode core body 4a positioned on the first end side 4A as viewed along the winding axis of the wound electrode assembly 3. As described above, the surface, on which the first protrusion 4x is formed, of the positive electrode core body 4a is arranged to be oriented toward the winding center (winding inner side) of the wound electrode assembly 3.

The protrusion height of the first protrusion 4x is preferably smaller than the thickness of one of the positive electrode active material layers 4b. The protrusion height of the first protrusion 4x is preferably smaller than the thickness of a portion having the positive electrode active material layers 4b formed on both its sides in the positive electrode core body 4a. The protrusion height of the first protrusion 4x is more preferably one-half or less the thickness of the portion having the positive electrode active material layers 4b formed on both its sides in the positive electrode core body 4a.

The protrusion height of the first protrusion 4x preferably changes along the first end side 4A. That is, a region where the protrusion height of the first protrusion 4x is partially small is preferably formed. As a result, stress to be applied to the first protrusion 4x can be reduced. Accordingly, the first protrusion 4x can be more effectively prevented from being detached from the positive electrode core body 4a. The protrusion height of the first protrusion 4x in the region where the protrusion height of the first protrusion 4x is partially small is preferably two-thirds or less and more preferably one-third or less the protrusion height of the first protrusion 4x in the portion where the protrusion height of the first protrusion 4x is the largest.

The second protrusion having a smaller height than the protrusion height of the first protrusion 4x may be formed on a surface, oriented toward the winding outer side (outer peripheral side) of the wound electrode assembly 3, of the positive electrode core body 4a.

In the wound electrode assembly 3, when the number of positive electrode plates 4 to be laminated is set to N1 (layers), the number of positive electrode tabs 40 to be laminated is preferably 0.8×N1 or more and more preferably 0.9×N1 or more.

In the wound electrode assembly 3, when the number of negative electrode plates 5 to be laminated is set to N2 (layers), the number of negative electrode tabs 50 to be laminated is preferably 0.8×N2 or more and more preferably 0.9×N2 or more.

[Connection Between Current Collector and Tab]

Figure 9:
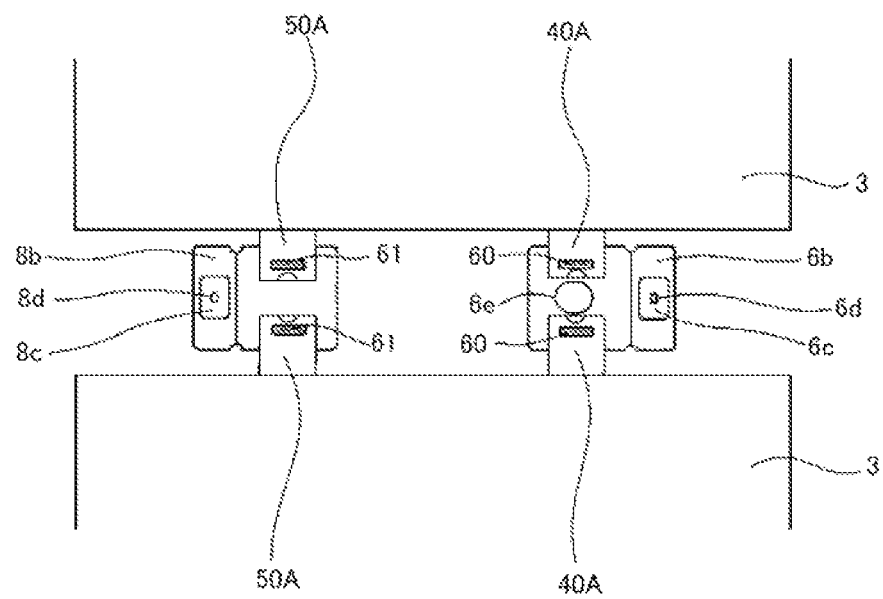
FIG. 9 is a diagram illustrating a state where a positive electrode tab group is connected to a second positive electrode current collector and a negative electrode tab group is connected to a second negative electrode current collector.

As illustrated in FIG. 9, respective positive electrode tab groups 40A in two wound electrode assemblies 3 are connected to the second positive electrode current collector 6b, and respective negative electrode tab groups 50A in two wound electrode assemblies 3 are connected to the second negative electrode current collector 8b. The positive electrode tab groups 40A are bonded to the second positive electrode current collector 6b, to respectively form bonding parts 60. The negative electrode tab groups 50A are bonded to the second negative electrode current collector 8b, to respectively form bonding parts 61. As a bonding method, ultrasonic welding (ultrasonic bonding), resistance welding, laser welding, or the like can be used.

A thin-walled part 6c is formed in the second positive electrode current collector 6b, and a current collector opening 6d is formed in the thin-walled part 6c. In the thin-walled part 6c, the second positive electrode current collector 6b is bonded to the first positive electrode current collector 6a. In the second positive electrode current collector 6b, a current collector through hole 6e is formed at a position opposing the electrolyte injection hole 15 in the sealing plate 2. A thin-walled part 8c is formed in the second negative electrode current collector 8b, and a current collector opening 8d is formed in the thin-walled part 8c. In the thin-walled part 8c, the second negative electrode current collector 8b is bonded to the first negative electrode current collector 8a.

[Attachment of Each Component to Sealing Plate]

Figure 10:
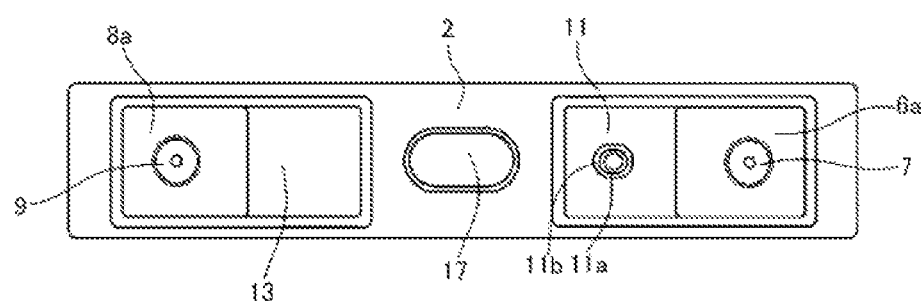
FIG. 10 is a diagram illustrating a surface on an electrode assembly side of a sealing plate to which a first positive electrode current collector and a first negative electrode current collector are attached.

FIG. 10 is a diagram illustrating a surface, on the inner side of the battery, of the sealing plate 2 to which each of components is attached. Each of the components is attached to the sealing plate 2 in the following manner.

The outer-side insulating member 10 is arranged on the outer surface side of the battery around a positive electrode terminal insertion hole 2a of the sealing plate 2. The inner-side insulating member 11 and the first positive electrode current collector 6a are arranged on the inner surface side of the battery around the positive electrode terminal insertion hole 2a of the sealing plate 2. The positive electrode terminal 7 is inserted into a through hole of the outer-side insulating member 10, the positive electrode terminal insertion hole 2a of the sealing plate 2, a through hole of the inner-side insulating member 11, and a through hole of the first positive electrode current collector 6a from the outer side of the battery, to caulk a distal end of the positive electrode terminal 7 onto the first positive electrode current collector 6a. As a result, the positive electrode terminal 7 and the first positive electrode current collector 6a are fixed to the sealing plate 2. A portion caulked in the positive electrode terminal 7 and the first positive electrode current collector 6a are preferably welded to each other.

The outer-side insulating member 12 is arranged on the outer surface side of the battery around a negative electrode terminal insertion hole 2b of the sealing plate 2. The inner-side insulating member 13 and the first negative electrode current collector 8a are arranged on the inner surface side of the battery around the negative electrode terminal insertion hole 2b of the sealing plate 2. The negative electrode terminal 9 is inserted into a through hole of the outer-side insulating member 12, the negative electrode terminal insertion hole 2b of the sealing plate 2, a through hole of the inner-side insulating member 13, and a through hole of the first negative electrode current collector 8a from the outer side of the battery, to caulk a distal end of the negative electrode terminal 9 onto the first negative electrode current collector 8a. As a result, the negative electrode terminal 9 and the first negative electrode current collector 8a are fixed to the sealing plate 2. A portion caulked in the negative electrode terminal 9 and the first negative electrode current collector 8a are preferably welded to each other.

A portion, opposing the electrolyte injection hole 15 provided in the sealing plate 2, in the inner-side insulating member 11 is provided with an injection opening 11a. An edge portion of the injection opening 11a is provided with a cylindrical part 11b.

[Connection Between First Current Collector and Second Current Collector]

Figure 11:
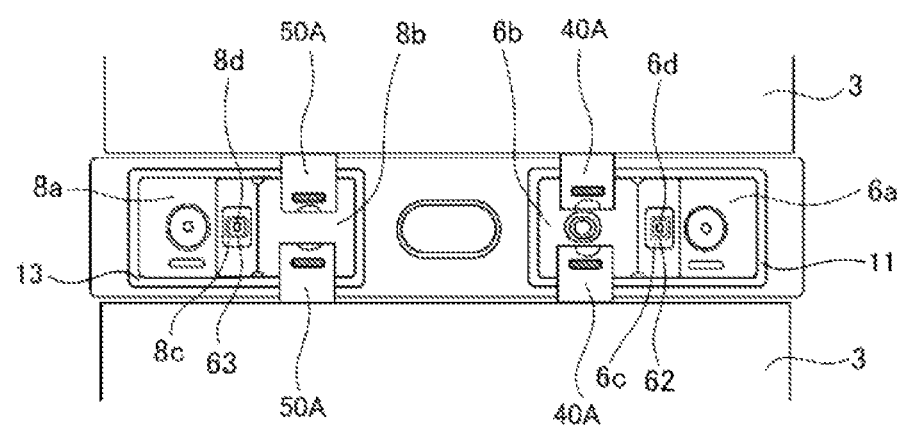
FIG. 11 is a diagram illustrating a surface on the electrode assembly side of the sealing plate after the second positive electrode current collector is attached to the first positive electrode current collector and the second negative electrode current collector is attached to the first negative electrode current collector.

FIG. 11 is a diagram illustrating a surface, on the inner side of the battery, of the sealing plate 2 after the second positive electrode current collector 6b is attached to the first positive electrode current collector 6a and the second negative electrode current collector 8*b* is attached to the first negative electrode current collector 8*a*.

The second positive electrode current collector 6*b* to which the positive electrode tab groups 40A are connected is arranged on the inner-side insulating member 11 such that its part overlaps the first positive electrode current collector 6*a*. The thin-walled part 6*c* is irradiated with a laser, to bond the second positive electrode current collector 6*b* and the first positive electrode current collector 6*a* to each other. As a result, a bonding part 62 is formed. The second negative electrode current collector 8*b* to which the negative electrode tab groups 50A are connected is arranged on the inner-side insulating member 13 such that its part overlaps the first negative electrode current collector 8*a*. The thin-walled part 8*c* is irradiated with a laser, to bond the second negative electrode current collector 8*b* and the first negative electrode current collector 8*a* to each other. As a result, a bonding part 63 is formed.

[Production of Secondary Battery]

The two positive electrode tab groups 40A and the two negative electrode tab groups 50A are curved such that an upper surface of one of the wound electrode assemblies 3 and an upper surface of the other wound electrode assembly 3 in FIG. 11 contact each other directly or via another member. As a result, the two wound electrode assemblies 3 are integrated. The two wound electrode assemblies 3 are arranged in the electrode assembly holder 14 composed of the insulating sheet shaped in a box shape or a bag shape.

The one positive electrode tab group 40A and the other positive electrode tab group 40A enter a state where they are respectively curved in different directions. The one negative electrode tab group 50A and the other negative electrode tab group 50A enter a state where they are respectively curved in different directions.

The two wound electrode assemblies 3 wrapped by the electrode assembly holder 14 are inserted into the rectangular exterior member 1. The sealing plate 2 and the rectangular exterior member 1 are welded to each other, and the opening of the rectangular exterior member 1 is sealed with the sealing plate 2. An electrolyte is injected into the rectangular exterior member 1 via the electrolyte injection hole 15 provided in the sealing plate 2. Then, the electrolyte injection hole 15 is sealed with the sealing member 16 such as a blind rivet. As a result, the rectangular secondary battery 20 is completed.

In the above-described embodiment, the first protrusion 4*x* in the vicinity of the first end side 4A of the positive electrode plate 4 has been described. However, the invention of the present application is not limited to the positive electrode plate side. Instead of the positive electrode plate side, the negative electrode plate side can also have a configuration related to the first protrusion disclosed in the above-described embodiment. Both the positive electrode plate side and the negative electrode plate side can also each have the configuration related to the first protrusion disclosed in the above-described embodiment.

When the core body is made of aluminum or an aluminum alloy, the protrusion height of the first protrusion easily becomes high. Accordingly, the invention of the present application is particularly effective when the core body is made of aluminum or an aluminum alloy.

Although an example in which the two wound electrode assemblies are arranged in the battery case has been illustrated in the above-described embodiment, the number of wound electrode assemblies may be one, or may be three or more.

Although an example in which each of the positive electrode current collector and the negative electrode current collector is composed of two components has been illustrated in the above-described embodiment, each of the positive electrode current collector and the negative electrode current collector may be composed of one component. If each of the positive electrode current collector and the negative electrode current collector is composed of one component, the positive electrode current collector and the negative electrode current collector are preferably respectively connected to the positive electrode terminal and the negative electrode terminal attached to the sealing plate after the positive electrode tab group and the negative electrode tab group are respectively connected to the positive electrode current collector and the negative electrode current collector.

Known materials can be respectively used for a positive electrode plate, a negative electrode plate, a separator, an electrolyte, and the like.

REFERENCE SIGNS LIST

20 Rectangular secondary battery
1 Rectangular exterior member
2 Sealing plate
2*a* Positive electrode terminal insertion hole
2*b* Negative electrode terminal insertion hole
100 Battery case
3 Wound electrode assembly
4 Positive electrode plate
4A First end side
4*a* Positive electrode core body
4*b* Positive electrode active material layer
4*c* Positive electrode protective layer
4*d* Positive electrode core body exposure part
4*f* Active material layer non-formation region
4*x* First protrusion
40 Positive electrode tab
40A Positive electrode tab group
400 Positive electrode original plate
401 Positive electrode original plate after tab formation
402 Final positive electrode original plate
5 Negative electrode plate
5*a* Negative electrode core body
5*b* Negative electrode active material layer
5*c* Negative electrode core body exposure part
50 Negative electrode tab
50A Negative electrode tab group
500 Negative electrode original plate
501 Negative electrode original plate after tab formation
502 Final negative electrode original plate
6 Positive electrode current collector
6*a* First positive electrode current collector
6*b* Second positive electrode current collector
6*c* Thin-walled part
6*d* Current collector opening
6*e* Current collector through hole
7 Positive electrode terminal
8 Negative electrode current collector
8*a* First negative electrode current collector
8*b* Second negative electrode current collector
8*c* Thin-walled part
8*d* Current collector opening
9 Negative electrode terminal
10 Outer-side insulating member
11 Inner-side insulating member
11*a* Injection opening 11b Cylindrical part
12 Outer-side insulating member
13 Inner-side insulating member
14 Electrode assembly holder
15 Electrolyte injection hole
16 Sealing member
17 Gas discharge valve
60, 61, 62.63 Bonding part
70 Separator

The invention claimed is:

1. A secondary battery comprising:
a strip-shaped first electrode plate having a plurality of first electrode tabs;
a strip-shaped second electrode plate having a different polarity from that of the first electrode plate;
a flat-shaped wound electrode assembly obtained by winding the first electrode plate and the second electrode plate with a strip-shaped separator therebetween; and
a first electrode current collector connected with the plurality of first electrode tabs laminated,
wherein the first electrode plate has a first electrode core body made of metal and a first electrode active material layer formed on the first electrode core body, and
on a first end side of the first electrode plate on which the plurality of first electrode tabs are provided,
a first protrusion protruding in a thickness direction of the first electrode core body from one surface of the first electrode core body is formed on the one surface of the first electrode core body,
a protrusion protruding in the thickness direction of the first electrode core body from the other surface of the first electrode core body is not formed on the other surface of the first electrode core body, or a second protrusion protruding in the thickness direction of the first electrode core body from the other surface of the first electrode core body and having a smaller protrusion height than a protrusion height of the first protrusion is formed on the other surface of the first electrode core body,
the protrusion height of the first protrusion is smaller than a thickness of the first electrode active material layer, and
in the wound electrode assembly, the one surface of the first electrode core body is arranged to be oriented toward a winding center side of the wound electrode assembly.

2. The secondary battery according to claim 1, wherein the first electrode plate is a positive electrode plate, and the second electrode plate is a negative electrode plate.

3. The secondary battery according to claim 1, wherein the first electrode tab is a part of the first electrode core body.

4. The secondary battery according to claim 1, wherein the first electrode core body is composed of aluminum or an aluminum alloy.

5. The secondary battery according to claim 1, wherein the plurality of first electrode tabs are connected to the first electrode current collector in a curved state.

6. The secondary battery according to claim 1, wherein the protrusion height of the first protrusion is smaller than a thickness of a portion of the electrode core body having the first electrode active material layer formed on the electrode core body.

7. The secondary battery according to claim 1, wherein the protrusion height of the first protrusion is one-half or less of a thickness of a portion of the positive electrode core body having the first electrode active material layer formed on the electrode core body.

8. The secondary battery according to claim 1, wherein the positive electrode core body has a second protrusion in the first end side on another surface of the electrode core body opposite to the first protrusion, and a protrusion height of the second protrusion is smaller than the protrusion height of the first protrusion.

9. The secondary battery according to claim 1, wherein the protrusion height of the first protrusion changes along the first end side.

10. The secondary battery according to claim 1, wherein the protrusion height of the first protrusion in a region where the protrusion height of the first protrusion is partially small is two-thirds or less the protrusion height of the first protrusion in a portion of the first protrusion where the protrusion height of the first protrusion is the largest.

* * * * *